J. NAUGLE.
Weeding Hoe.
No. 48,304. Patented June 20, 1865.
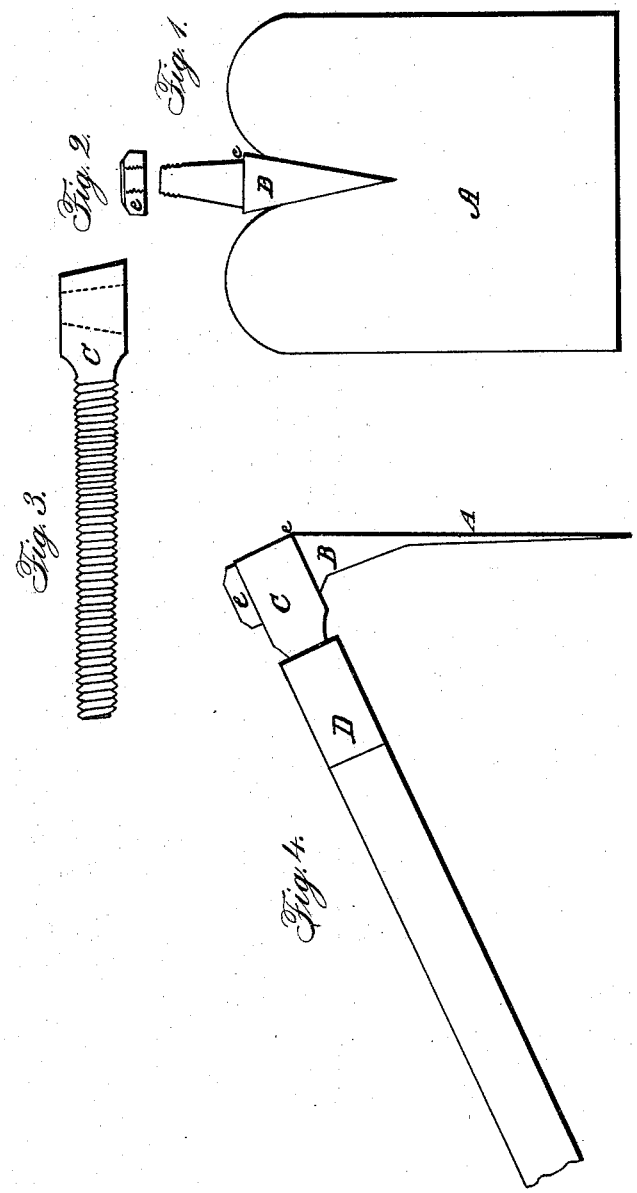
Witnesses:
Chas. L. Du Bois
Jos. H. Windley
Inventor:
John Naugle
Metzger Stribler & Simpson
atty's

UNITED STATES PATENT OFFICE.

JOHN NAUGLE, OF MOORESVILLE, INDIANA.

IMPROVEMENT IN WEEDING-HOES.

Specification forming part of Letters Patent No. 48,304, dated June 20, 1865.

*To all whom it may concern:*

Be it known that I, JOHN NAUGLE, of Mooresville, in the county of Morgan and State of Indiana, have invented a new and Improved Method for Constructing Weeding-Hoes; and I do hereby declare that the following is a full and exact description thereof, reference being had to the accompanying drawings, and to the letters of reference marked thereon.

The nature of my invention consists in so constructing a weeding-hoe that while it is firmly attached to the handle it shall be clear of the spring and trembling which prevent the common goose-necked hoe from being effective in cutting hard substances, and also allowing the hoe-blade to be easily removed from the shank and any other shaped blade to be attached in its place, to enable the operator to suit the tool to the work on hand.

To enable those skilled in the art to make and use my invention, I will proceed to describe its construction and operation.

In the drawings, Figure 1 is the hoe blade and neck. Fig. 2 represents the nut which secures the shank to the neck. Fig. 3 is the shank; and Fig. 4 shows the hoe complete.

A represents the blade, and B the neck, of the hoe, which is firmly welded to the blade. This neck is made square, or nearly so, from the shoulder $c$ up, and tapering to fit the hole in the shank. It has a screw-thread on the top to secure the nut $e$.

C is the shank of the hoe, which is firmly secured into the handle, it having a screw-thread cut upon it for that purpose. It has a square hole through it, as indicated by lines in the drawings, to receive the neck of the hoe, and rests on the shoulder $c$, the nut $e$ holding it firmly to its place when the parts are put together, as in Fig. 4, at the same time allowing the blade to be easily removed, when desired. Hoes constructed in this manner possess great firmness and rigidity, there being no trembling or spring, except in the handle, and are far superior to the ordinary hoe for various kinds of cultivation, especially in new grounds.

Having thus described my invention, what I claim as new, and desire to secure by Letters Patent, is—

1. The construction, arrangement, and combination of the different parts of the hoe, substantially as described.

2. The method herein described of fastening the hoe to the shank, as set forth.

JOHN NAUGLE.

Witnesses:
 B. F. BUTLER,
 A. H. CRAYTON.